US008757497B2

(12) United States Patent
Zhao et al.

(10) Patent No.: US 8,757,497 B2
(45) Date of Patent: Jun. 24, 2014

(54) WIRELESS DATA CARD AND ELECTRONIC DEVICE

(75) Inventors: Shuai Zhao, Shenzhen (CN); Yanzhu Huang, Shenzhen (CN); You Lin, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 995 days.

(21) Appl. No.: 12/553,642

(22) Filed: Sep. 3, 2009

(65) Prior Publication Data

US 2010/0051698 A1 Mar. 4, 2010

(30) Foreign Application Priority Data

Sep. 4, 2008 (CN) ...................... 2008 2 0134655 U

(51) Int. Cl.
*G06K 7/00* (2006.01)

(52) U.S. Cl.
USPC ........................................................ 235/486

(58) Field of Classification Search
USPC ........................................................ 235/486
See application file for complete search history.

(56) References Cited

U.S. PATENT DOCUMENTS

| | | | | |
|---|---|---|---|---|
| 6,332,790 | B1 * | 12/2001 | Ishikawa et al. | 439/157 |
| 6,545,643 | B1 * | 4/2003 | Sward et al. | 343/702 |
| 2002/0145855 | A1 * | 10/2002 | Ohki | 361/737 |
| 2003/0124888 | A1 * | 7/2003 | Collins | 439/131 |

FOREIGN PATENT DOCUMENTS

| | | | |
|---|---|---|---|
| EP | 1132860 | A2 | 9/2001 |
| EP | 1 158 458 | A2 | 11/2001 |
| JP | 10255905 | A | 9/1998 |
| WO | WO 01/57784 | | 8/2001 |

OTHER PUBLICATIONS

European Patent Office Communication enclosing the extended European search report, which includes, pursuant to Rule 62 EPC, the European search report (R. 61 EPC) or the partial European search report/declaration of no search (R. 63 EPC) and the European search opinion, dated Jan. 19, 2010, 5 pgs.
European Patent Office Communication pursuant to Article 94(3) EPC, dated May 6, 2010, 5 pgs.
European Patent Office Communication pursuant to Article 94(3) EPC, European search opinion for Application No. 09169406.7, mailed May 6, 2010, Huawei Technologies Co.
Summons to Attend Oral Proceedings dated Jan. 31, 2011, issued in European Application No. 09169406.7, Huawei Technologies Co.

* cited by examiner

*Primary Examiner* — Michael G Lee
*Assistant Examiner* — David Tardif
(74) *Attorney, Agent, or Firm* — Conley Rose, P.C.; Grant Rodolph; Nicholas K. Beaulieu

(57) ABSTRACT

A wireless data card and an electronic device, which relate to wireless communication equipment, are adapted to solve the technical problem that the exposed size of an antenna of a built-in wireless data card used in an existing electronic device is too small to achieve a desired performance of receiving radio signals for the antenna. The wireless data card includes a data card body and an antenna electrically connected to the data card body. An elastic structure capable of enabling the antenna to extend out of the data card body and also retract into the data card body is disposed between the data card body and the antenna. The electronic device includes a device case provided with a device port and the wireless data card disclosed above in this disclosure, in which the wireless data card is disposed in the device case and relative to the device port, and the antenna is disposed relative to the device port. This disclosure is applied for transmitting wireless data communication signals.

20 Claims, 10 Drawing Sheets

WIRELESS DATA CARD AND ELECTRONIC DEVICE

CROSS-REFERENCE TO RELATED APPLICATIONS

This application claims priority to Chinese Patent Application No. 200820134655.8, filed on Sep. 4, 2008, which is hereby incorporated by reference in its entirety.

FIELD OF THE TECHNOLOGY

This present invention relates to wireless communication equipment, and more particularly to a wireless data card and an electronic device.

BACKGROUND OF THE INVENTION

Nowadays, the society has entered the information era, and network has become an important source for acquiring information. The wireless data card, advantageous in its convenience, rapidness, and high speed, functions as a data signal transmission device that is required in a portable electronic device such as a notebook computer through which users can frequently get access to the Internet. The data card for wireless EXPRESS interface, advantageous in having a small volume and a light weight, is increasingly favored by users of portable electronic devices such as notebook computers.

After a conventional wireless data card for wireless EXPRESS interface is inserted in a portable electronic device such as a notebook computer, the exposed part of the card is too long, and the user finds it difficult to put the portable electronic device such as the notebook computer into a bag for storage, so that the wireless data card can only be stored separately after being pulled out, and again inserted in the portable electronic device when being used. As it is rather inconvenient for the user to insert and pull out the card, a built-in wireless data card 21 as shown in FIG. 1 is provided. The wireless data card is mainly disposed in the case of a portable electronic device such as a notebook computer 20, and only a very short part of the antenna is exposed outside the case for receiving radio data signals and for drawing out or pushing back the antenna. As the exposed part of the built-in wireless data card 21 is very small, the wireless data card can be inserted in the portable electronic device such as the notebook computer 20 without being pulled out and stored separately. Therefore, the user is enabled to put the portable electronic device such as the notebook computer 20 in the bag without pulling out the wireless data card, which is quite convenient.

During the implementation of this disclosure, the inventors found that though the existing built-in wireless data card makes it easy to some extent for the user to put the electronic device with the wireless data card into a bag for storage, the following problem still exists.

The exposed size of the antenna of the existing built-in wireless data card is small, and an antenna having a smaller exposed size may acquire a poorer performance in receiving radio signals, so the receiving performance of the built-in wireless data card may not be guaranteed.

SUMMARY OF THE INVENTION

Accordingly, this disclosure is directed to a wireless data card, which not only makes it easy for the user to put an electronic device with the wireless data card into a bag for storage, but also ensures a desired capability of receiving radio data signals.

The following technical solution is provided in an embodiment of this disclosure.

The wireless data card includes a data card body and an antenna electrically connected to the data card body. An elastic structure capable of enabling the antenna to extend out of the data card body and also retract into the data card body is disposed between the data card body and the antenna.

This disclosure is also directed to an electronic device, which is adapted to solve the technical problem that the exposed size of the antenna of a built-in wireless data card used in an existing electronic device is too small to achieve a desired performance of receiving radio signals for the antenna.

The electronic device includes a device case provided with a device port and a wireless data card disposed in the device case and relative to the device port. The wireless data card includes a data card body and an antenna electrically connected to the data card body. The antenna is disposed relative to the device port. An elastic structure capable of enabling the antenna to extend out of the data card body and the device port as well as to retract into the data card body and the device port is disposed between the data card body and the antenna.

Compared with the prior art, the elastic structure of the disclosed wireless data card is capable of enabling the antenna to extend out of the data card body and the device port as well as to retract into the data card body and the device port. Therefore, when required to get access to the network, the elastic structure can be operated to control the antenna in a state of extending out of the data card body, and as the antenna is disposed relative to the device port, the antenna in the state of extending out of the data card body further extends out of the device port of the device case, thus ensuring a desired capability of receiving radio data signals; and when not required to get access to the network, the elastic structure can be operated to control the antenna in a state of retracting into the data card body, so that the antenna penetrating through the device port retracts into the device port. In this manner, the electronic device can be put into a bag with the wireless data card inserted therein and it is not necessary for the user to pull out the wireless data card, which facilitates the use of the wireless data card. Moreover, the disclosed wireless data card not only makes it easy for the user to put an electronic device with the wireless data card into a bag for storage, but also ensures a desired capability of receiving radio data signals. Therefore, the technical problem that the exposed size of the antenna of a built-in wireless data card used in an existing electronic device is too small to achieve a desired performance of receiving radio signals for the antenna is solved.

BRIEF DESCRIPTION OF THE DRAWINGS

The disclosure will become better understood from the detailed description given herein below for illustration only by referring to the accompanying drawings among which.

DETAILED DESCRIPTION OF THE EMBODIMENTS

Embodiments of this disclosure will be illustrated in detail below with reference to the accompanying drawings.

This disclosure provides a wireless data card which not only has a desired capability of receiving radio data signals but also makes it easy for the user to put an electronic device with the wireless data card in a bag for storage.

Figure 2:
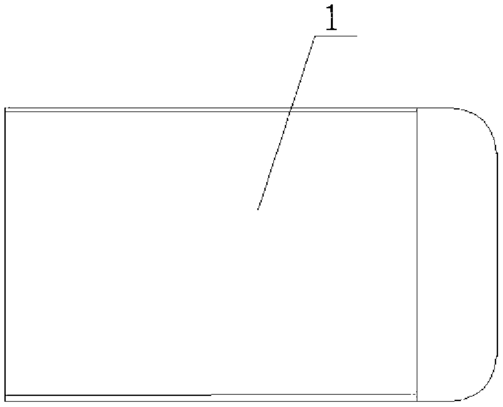
FIG. 2 is a front view of a wireless data card according to an embodiment of this disclosure, in which an antenna of the data card is in a state of retracting into a data card body.
Figure 3:
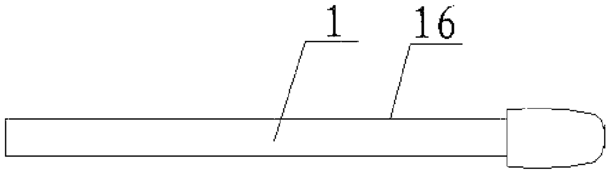
FIG. 3 is a top view of the wireless data card as shown in FIG. 2.
Figure 4:
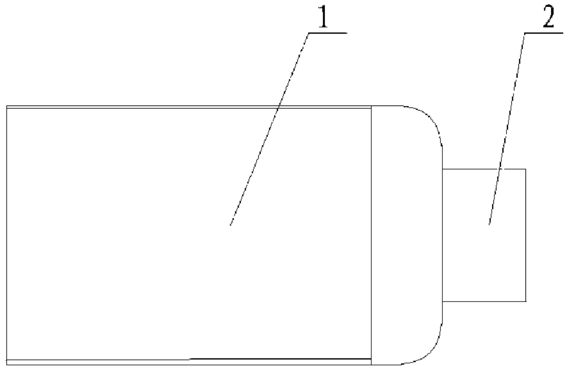
FIG. 4 is a front view of the wireless data card according to an embodiment of this disclosure, in which the antenna of the data card is in a state of extending out of the data card body.

Referring to FIGS. 2, 3, and 4, a wireless data card is provided in an embodiment of this disclosure. The wireless data card includes a data card body 1 and an antenna 2 electrically connected to the data card body 1. An elastic structure capable of enabling the antenna 2 to extend out of the data card body 1 and also retracting into the data card body 1 is disposed between the data card body 1 and the antenna 2.

Figure 5:
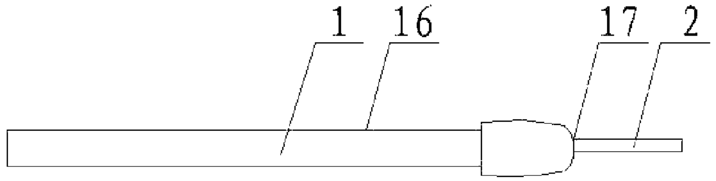
FIG. 5 is a top view of the wireless data card as shown in FIG. 4.

When using the antenna 2, the elastic structure enables the antenna 2 to be in a state of extending out of the data card body 1 as shown in FIGS. 4 and 5, which not only increases the receiving space of the antenna 2, but also prevents the data card body 1 from affecting the receiving performance of the antenna 2, thereby ensuring that the antenna 2 has a desired capability of receiving radio data signals. When finishing using the antenna 2, the elastic structure enables the antenna 2 to be in a state of retracting into the data card body 1 as shown in FIGS. 2 and 3, so that the volume of the antenna 2 outside the data card body 1 is reduced without pulling out the antenna 2, and it is convenient for the user to put an electronic device with the wireless data card into a bag for storage.

Figure 6:
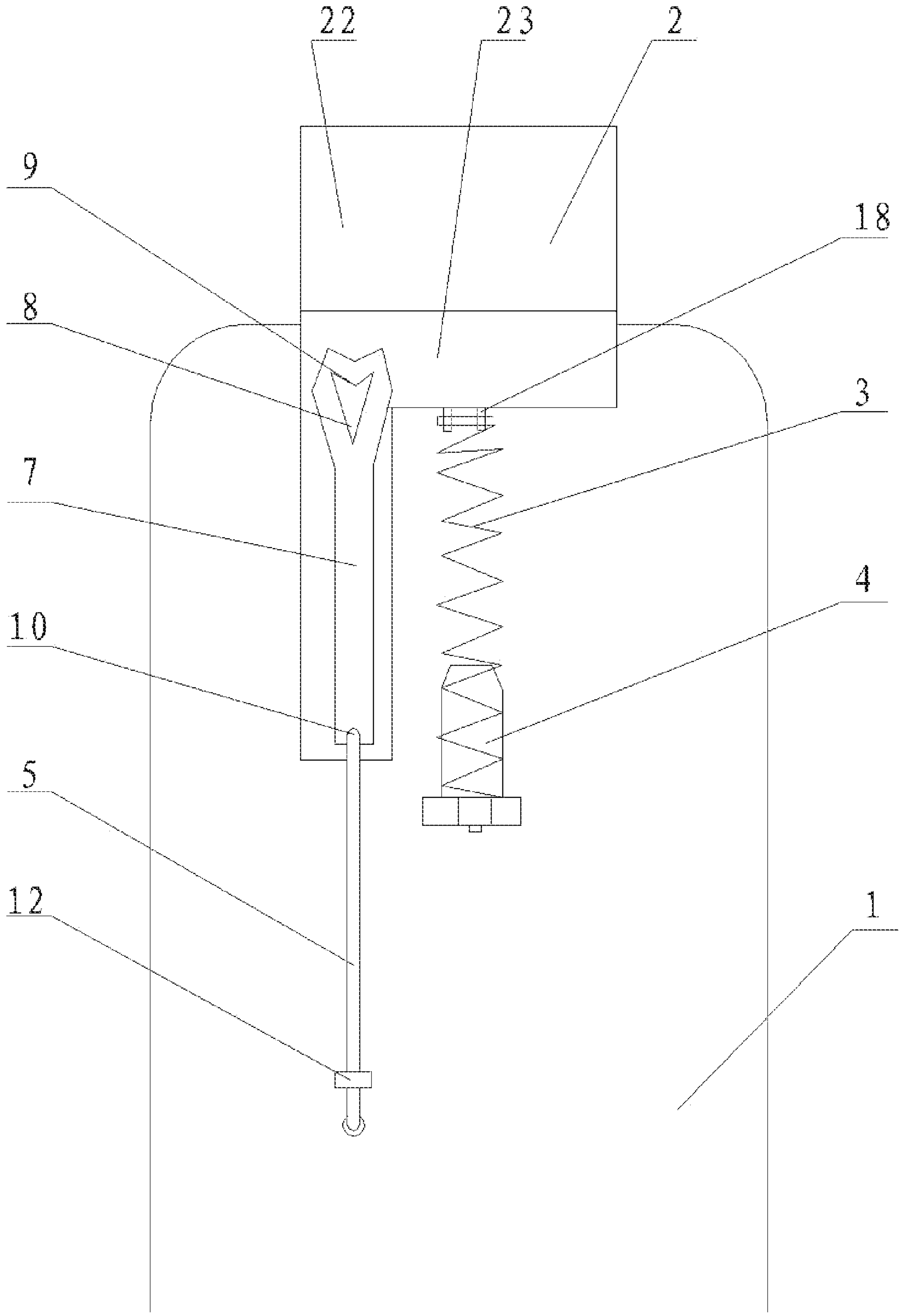
FIG. 6 is a schematic view of an elastic structure in the wireless data card according to an embodiment of this disclosure, in which the antenna of the data card is in the state of extending out of the data card body.
Figure 7:
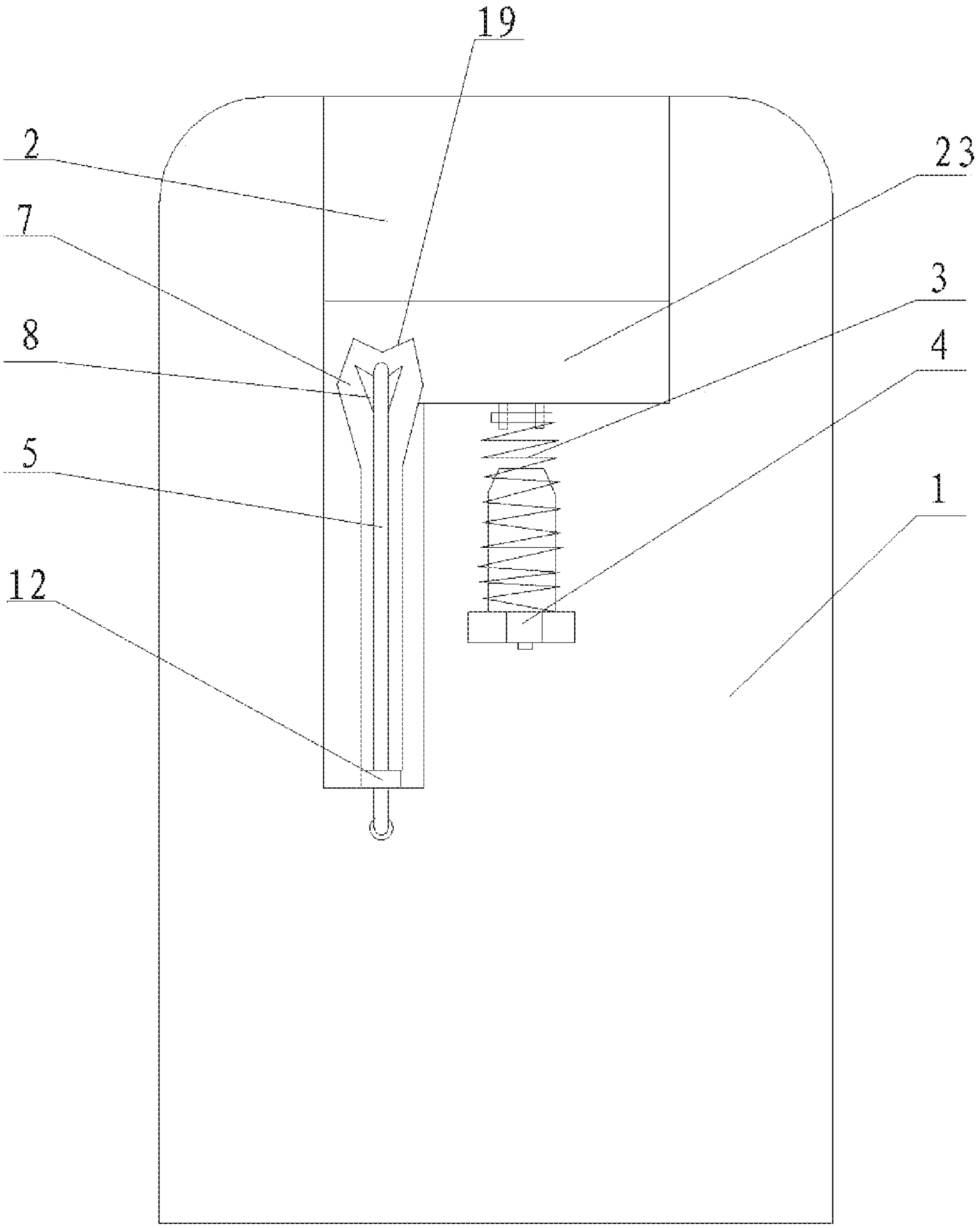
FIG. 7 is a schematic view of the elastic structure in the wireless data card according to an embodiment of this disclosure, in which the antenna of the data card is in the state of retracting into the data card body.

Referring to FIGS. 6 and 7, the elastic structure includes an elastic member 3 and a fastener. The elastic member 3 is disposed between the antenna 2 and the data card body 1. The antenna 2 is enabled to extend out of the data card body 1 or retract into the data card body 1 along with the stretching or compression of the elastic member 3, and the fastener is capable of fixing the antenna 2 in a state of retracting into the data card body 1. The elastic member 3 may be a spring, a rubber band, or a rubber pad. The fastener may adopt a structure of a pin engaged in a hole. For example, two through-holes are respectively opened in the data card body 1 and the antenna 2. When the antenna 2 is in the state of retracting into the data card body 1, the two through-holes are right facing each other, and at this time, the pin is inserted to prevent the antenna 2 from extending out of the data card body 1 under the elastic force of the elastic member 3. The pin is removed when the antenna 2 is needed to be used, so that the antenna 2 automatically extends out of the data card body 1 under the elastic force of the elastic member 3. The pin may also be replaced by a press-button or a catch. The fastener may include a hook on the antenna 2 and a positioning groove or hole opened in the data card body 1. When the antenna 2 is in the state of retracting into the data card body 1, the hook is engaged in the positioning groove or hole, and when the hook is released from the positioning groove or hole, the antenna 2 automatically extends out of the data card body 1 under the elastic force of the elastic member 3.

Figure 9:
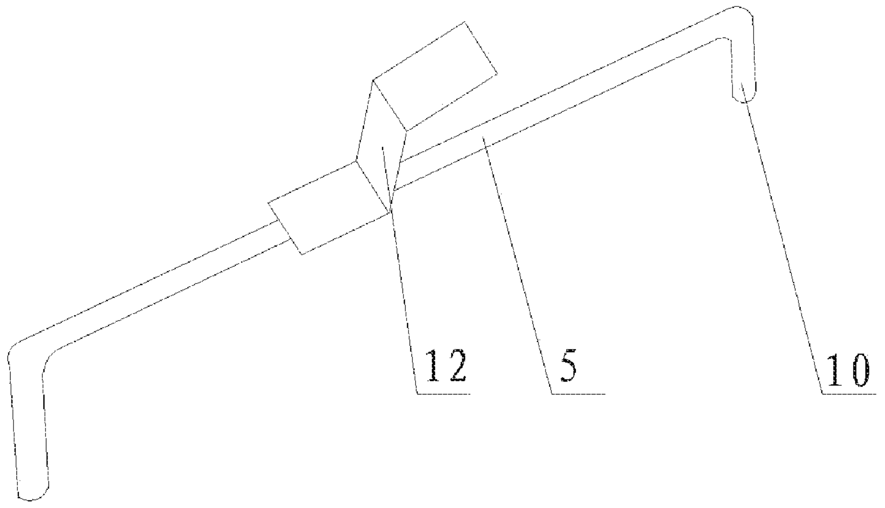
FIG. 9 is a schematic view of an implementation of the slide rod in the wireless data card according to an embodiment of this disclosure.

The fastener includes a slide rod 5 fixedly connected to the data card body 1 and a slideway 7 disposed on the antenna 2. A stopping boss 8 is disposed on a bottom surface of the slideway 7 away from the data card body 1, and a protruding point 11 relative to the stopping boss 8 is disposed on an inner wall 19 of the slideway 7 away from the data card body 1. One end of the slide rod 5 is provided with a buckle 10 as shown in FIGS. 6 and 9, and the buckle 10 is embedded in the slideway 7 and capable of sliding in the slideway 7.

Figure 8:
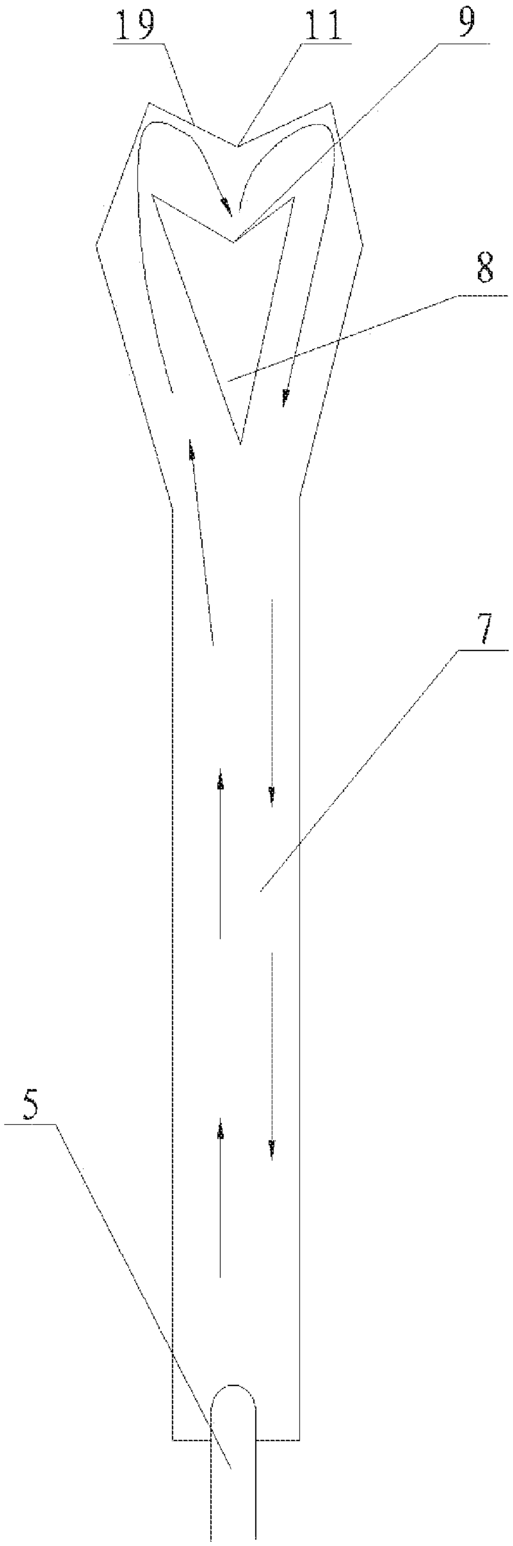
FIG. 8 is a schematic view of sliding directions of a slide rod in a slideway of the wireless data card according to an embodiment of this disclosure.

Referring to FIGS. 6, 7, and 8, when the antenna 2 in the state of extending out of the data card body 1 is pushed in a direction towards the data card body 1, the antenna 2 gradually retracts into the data card body 1, and meanwhile the end of the slide rod 5 provided with the buckle 10 slides in the slideway 7. When the antenna 2 bypasses the stopping boss 8 and completely retracts into the data card body 1, the buckle 10 rests against a side wall of the protruding point 11. If a force imposed on the antenna 2 is released at this time, the antenna 2 draws back under the elastic force of the elastic member 3, and the buckle 10 slides along the side wall of the protruding point 11. As the protruding point 11 is disposed relative to the stopping boss 8, the buckle 10 falls on one side of the stopping boss 8 away from the data card body 1. As the slide rod 5 is fixedly connected to the data card body 1, the buckle 10 catches the stopping boss 8, and the antenna 2 is hooked by the buckle 10 in the state of retracting into the data card body 1. When the antenna 2 is used, the antenna 2 is pushed again, so that the buckle 10 is leaves the stopping boss 8, and again rests against the side wall of the protruding point 11 and slides in a direction departing from the stopping boss 8 along the side wall of the protruding point 11. If a force imposed on the antenna 2 is released at this time, the buckle 10 slides off from a side surface of the stopping boss 8, so that the antenna 2 released from the engagement of the buckle 10 extends out of the data card body 1 under the elastic force of the elastic member 3, and restores the state of extending out of the data card body 1.

Referring to FIGS. 6 and 7, in this embodiment, the antenna 2 includes an antenna body 22 and a connecting member 23 connected to the antenna body 22. The slideway 7 is disposed on the connecting member 23. The antenna body 22 may be electrically connected to the data card body 1 directly or through the connecting member 23. The connecting member 23 may be integrally formed with the antenna body 22, or pivoted to the antenna body 22. If the connecting member 23 is pivoted to the antenna body 22, when the antenna 2 is in the state of extending out of the data card body 1, the antenna body 22 may be rotated around the pivot of the antenna body 22 and the connecting member 23 to adjust the receiving direction of the antenna body 22 for receiving radio data signals, thereby enhancing the desired capability of the antenna 2 for receiving radio data signals.

Alternatively, the slide rod 5 of the fastener may also be fixedly disposed on the antenna 2 or the connecting member 23, and the slideway 7 is disposed on the data card body 1. The fastener of such a structure has the same function as the aforementioned fastener.

Figure 15:
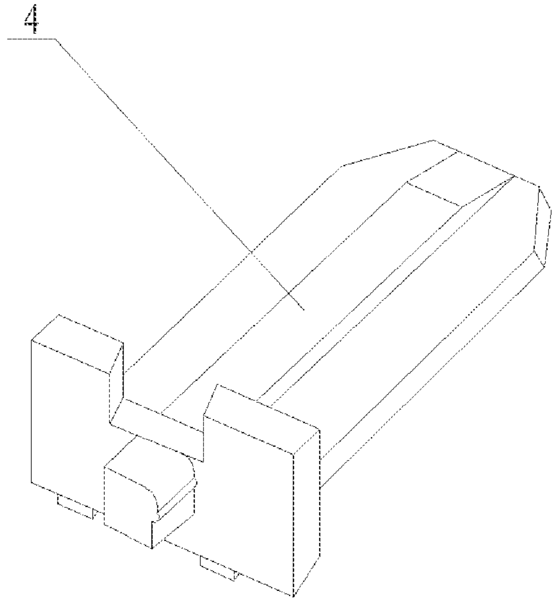
FIG. 15 is a schematic three-dimensional view of a support latch in the wireless data card according to an embodiment of this disclosure.

The elastic member 3 may be a spring, the data card body 1 and/or the antenna 2 is fixedly disposed with a support latch 4, and the elastic member 3 is fixedly connected to the support latch 4. In an embodiment of this disclosure, as shown in FIG. 15, the support latch 4 is fixedly disposed on the data card body 1, and one end of the elastic member 3 is fixedly connected to the support latch 4, while the other end thereof rests against the antenna body 22 or the connecting member 23. One end of the connecting member 23 away from the antenna body 22 is disposed with at least one insertion protrusion 18, and alternatively, the insertion protrusion 18 may also be directly disposed on the antenna body 22. One end of the elastic member 3 is fixedly connected to the support latch 4, and the other end thereof is inserted in the insertion protrusion 18. Alternatively, the positions of the insertion protrusion 18 and the support latch 4 may be exchanged, that is, the insertion protrusion 18 is disposed on the data card body 1, and the support latch 4 is disposed on one end of the antenna 2 or the connecting member 23 away from the antenna body 22. The data card body 1 and the antenna 2 may be flicked apart by the tension of the spring in a natural state. Alternatively, the data card body 1 and the antenna 2 may also be pulled apart by the pulling force of the spring in a natural state.

One side of the stopping boss 8 close to the data card body 1 is in the shape of a pointed prism, and one side of the stopping boss 8 close to the antenna 2 is configured with a groove 9 matching with the buckle 10. Being in the shape of a pointed prism, the side of the stopping boss 8 close to the data card body 1 reduces the area for holding up the slide rod 5 which slides along the slideway 7 in a direction towards the antenna 2, so that the slide rod 5 successfully slides in the slideway 7 and bypasses the stopping boss 8, and meanwhile, the antenna 2 also successfully retracts into the data card body 1. The groove 9 reliably retains the buckle 10, thus preventing the buckle 10 from being unlocked by the stopping boss 8 due to vibration or shock. When the antenna 2 is in the state of extending out of the data card body 1, the buckle 10 is hooked at an inner wall, which is far away from the antenna 2, of the slideway 7, thereby preventing the antenna 2 from being completely departed from the data card body 1 under the elastic force of the elastic member 3. When the antenna 2 is in the state of retracting into the data card body 1, the buckle 10 is hooked by the groove 9 of the stopping boss 8.

Referring to FIGS. 6 and 7, in an embodiment of this disclosure, the bottom surface of the slideway 7 where the stopping boss 8 is disposed is wider than that of the slideway 7 close to the data card body 1. In particular, two slide rails on which the buckle 10 can slide need to be formed between the stopping boss 8 and a side wall of the slideway 7, i.e., a slide-in rail for sliding into the groove 9 on the stopping boss 8 and a slide-out rail for sliding out of the groove 9 on the stopping boss 8. In contrast, the slideway 7 close to the data card body 1 only needs one slide rail connecting the slide-in rail and the slide-out, the slide-in rail and the slide-out being in the state of through-connection, so as to achieve the purpose of guiding the sliding directions. Therefore, the bottom surface of the slideway 7 where the stopping boss 8 is disposed is wider than that of the slideway 7 close to the data card body 1.

Referring to FIGS. 6, 7, and 8, the inner wall 19 of the slideway 7 away from the data card body 1 is in the shape of an inverted W, and the protruding point 11 is located at the center of the inner wall 19. When the antenna 2 is in the state of retracting into the data card body 1, the buckle 10 is retained in the groove 9 of the stopping boss 8, and if the antenna 2 is pushed inwards at this time, the buckle 10 is unhooked by the groove 9 of the stopping boss 8 and rests against the inner wall 19 of the slideway 7 away from the data card body 1. As the protruding point 11 is located at the center of the inner wall 19 and disposed relative to the groove 9 on the stopping boss 8, the buckle 10 slides along two side walls of the protruding point 11 in a direction departing from the stopping boss 8.

When sliding to edges on two sides of the slideway 7 away from the inner wall 19 of the data card body 1, if a force imposed on the antenna 2 is released at this time, the buckle 10 may slide off from the periphery of the stopping boss 8, so that the antenna 2 is released from the buckle 10 under the elastic force of the elastic member 3, and restores the state of extending out of the data card body 1. As the inner wall 19 of the slideway 7 away from the data card body 1 is in the shape of an inverted W, no matter sliding to which one of the two sides of the protruding point 11, the buckle 10 will slide off from the periphery of the stopping boss 8.

Figure 11:
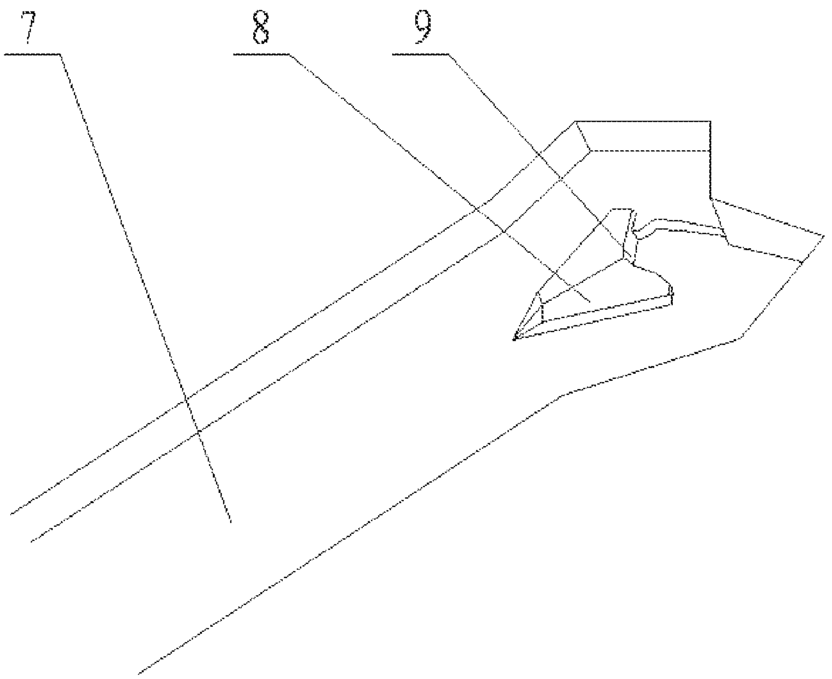
FIG. 11 is a schematic three-dimensional view of an implementation of a retaining step in the wireless data card according to an embodiment of this disclosure.
Figure 12:
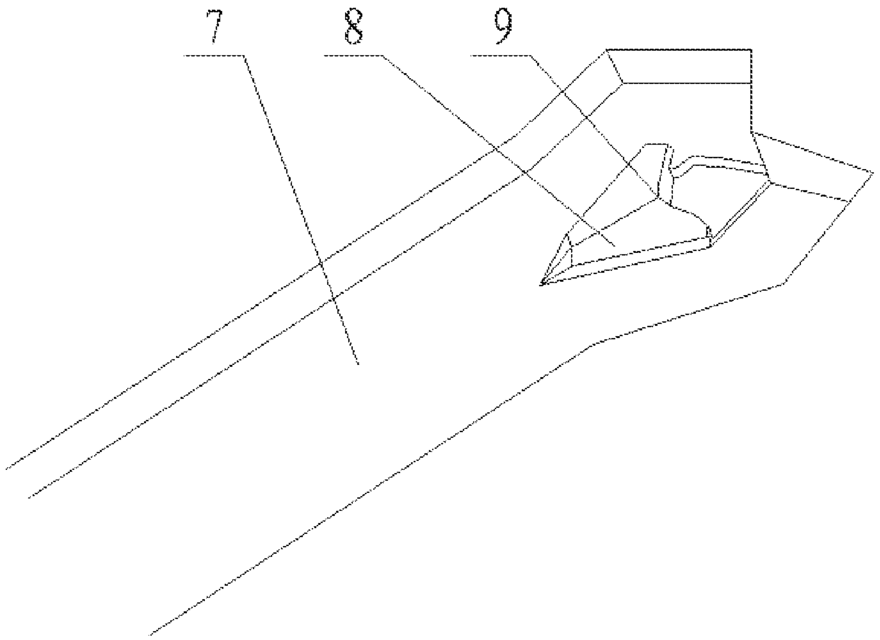
FIG. 12 is a schematic three-dimensional view of another implementation of the retaining step in the wireless data card according to an embodiment of this disclosure.
Figure 13:
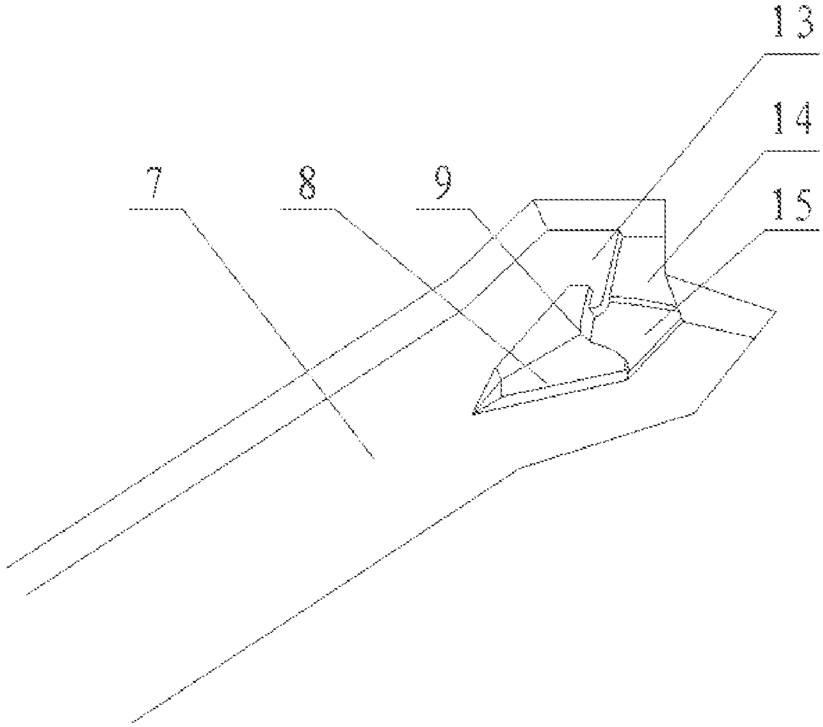
FIG. 13 is a schematic three-dimensional view of still another implementation of the retaining step in the wireless data card according to an embodiment of this disclosure.

At least one retaining step is disposed on the bottom surface of the slideway 7 between the stopping boss 8 and the slideway 7. The retaining step is capable of preventing the buckle 10 from sliding back when sliding in the slideway 7. One retaining step may be set as shown in FIG. 11, and two may also be set as shown in FIG. 12. In this embodiment, three retaining steps are set, which are respectively a first step 13, a second step 14, and a third step 15 with descending heights as shown in FIG. 13. The first step 13 is disposed on the bottom surface of the slideway 7 between the stopping boss 8 and a side wall of the slideway 7, and the first step 13 is higher than the bottom surface of the slideway 7 and is smoothly connected thereto. The second step 14 is disposed on the bottom surface of the slideway 7 between the first step 13 and the inner wall 19 of the slideway 7 close to the antenna 2, and is lower than the first step 13. The third step 15 is disposed on the bottom surface of the slideway 7 between the stopping boss 8 and the inner wall 19 of the slideway 7 close to the antenna 2, and is lower than the second step 14.

Figure 14:
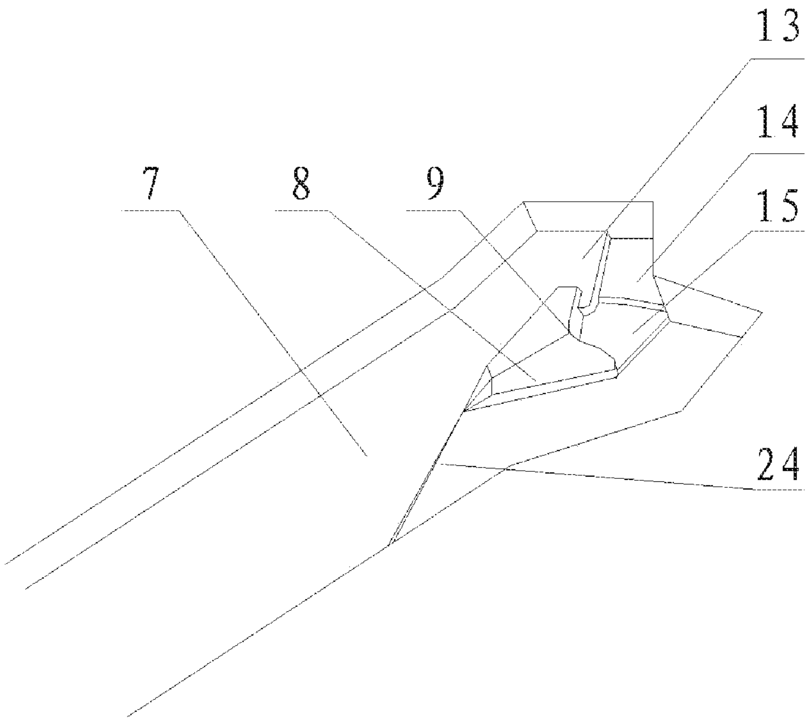
FIG. 14 is a schematic three-dimensional view of still another implementation of the retaining step in the wireless data card according to an embodiment of this disclosure.

Referring to FIG. 14, in an embodiment of this disclosure, a guiding step 24 is further disposed on the bottom surface of the slideway 7 between the stopping boss 8 and the side wall of the slideway 7 away from the first step 13, and the guiding step 24 is higher than the bottom surface of the slideway 7. An edge of the guiding step 24 extends straightly from the end of the stopping boss 8 in the shape of a pointed prism towards the side wall of the slideway 7 away from the first step 13 and the third step 15. When the antenna 2 changes from the state of extending out of the data card body 1 to the state of retracting into the data card body 1, the buckle 10 on the slide rod 5, when sliding to the end of the stopping boss 8 in the shape of a pointed prism, may be held up by the edge of the guiding step 24 and slide along the edge thereof. The buckle 10 on the slide rod 5 held back by the guiding step 24 first slides to the first step 13, then sequentially passes through the second step 14 and the third step 15, and finally falls in the groove 9, so that the antenna 2 changes to the state of retracting into the data card body 1. When the antenna 2 changes from the state of retracting into the data card body 1 to the state of extending out of the data card body 1, the buckle 10 released from the groove 9 first slides to the third step 15, then slides off from the side of the stopping boss 8 more smoothly, and finally slides through the guiding step 24 into the slideway 7 away from the stopping boss 8, so that the antenna 2 changes to the state of extending out of the data card body 1.

Seen from the above, the first step 13 prevents the buckle 10 from sliding back without bypassing the stopping boss 8, the second step 14 prevents the buckle 10 from sliding back without being hooked in the groove 9, and the third step 15 prevents the buckle 10 from sliding back to be re-hooked in the groove 9 after being released from the same.

In still another embodiment of this disclosure, the end of the stopping boss 8 in the shape of a pointed prism inclines towards the third step 15, and the position which the groove 9 is set on the stopping boss 8 is close to the third step 15.

The end of the stopping boss 8 in the shape of a pointed prism inclines towards the third step 15, which achieves the following advantage. When the antenna 2 changes from the state of extending out of the data card body 1 to the state of retracting into the data card body 1, the buckle 10 on the slide rod 5 first slides to the first step 13 and the second step 14. The position which the groove 9 is set on the stopping boss 8 is close to the third step 15, which achieves the following advantage. When the antenna 2 changes from the state of retracting into the data card body 1 to the state of extending out of the data card body 1, the buckle 10 on the slide rod 5 slides out of the third step 15, and finally slides into the slideway 7 away from the stopping boss 8.

Figure 10:
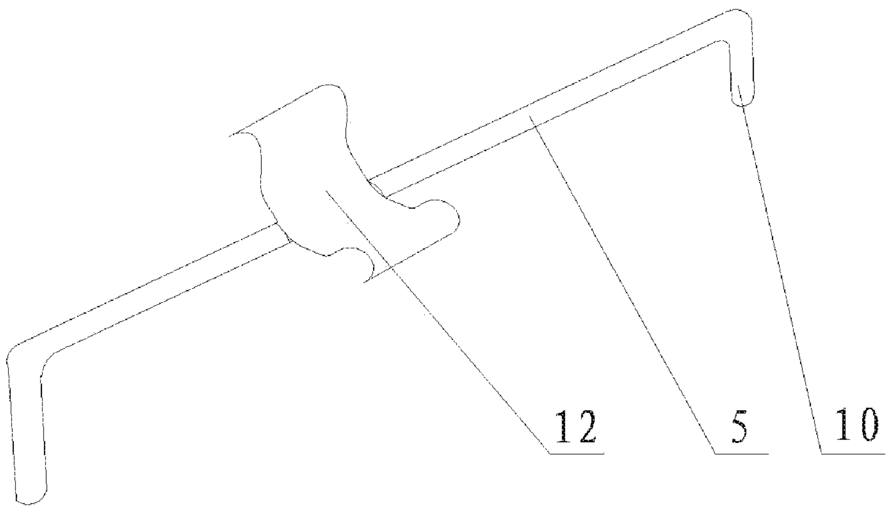
FIG. 10 is a schematic view of another implementation of the slide rod in the wireless data card according to an embodiment of this disclosure.

Referring to FIGS. 3 and 5, the data card body 1 includes a data card case 16 provided with an antenna port 17 and a circuit board disposed in the data card case 16. The antenna 2 is electrically connected to the circuit board and penetrates through the antenna port 17. One side of the slide rod 5 away from the data card body 1 and the connecting member 23 of the antenna 2 is disposed with a slide-rod blade spring 12. One end of the slide-rod blade spring 12 is fixedly connected to the slide rod 5, and the other end thereof rests against an inner wall of the data card case 16. The longitudinal section of the slide-rod blade spring 12 is S-shaped as shown in FIG. 9 or M-shaped as shown in FIG. 10, and alternatively may also be Z-shaped, V-shaped, or the like. The inner wall of the data card case 16 applies an elastic force to the slide rod 5 through the slide-rod blade spring 12, so as to enable the buckle 10 to contact the bottom surface of the slideway 7, thereby preventing the buckle 10 from falling off the slideway 7.

When the wireless data card provided by this disclosure is used, the antenna is in the state of extending out of the data card body, so as to ensure a desired capability of receiving radio data signals; and when carried along with the user, the antenna is in the state of retracting into the data card body, which makes it easy for the user to put an electronic device with the data card into a bag for storage.

An electronic device which not only has a desired capability of receiving radio data signals but is also convenient to be put in a bag for storage is further provided in an embodiment of this disclosure.

Figure 1:
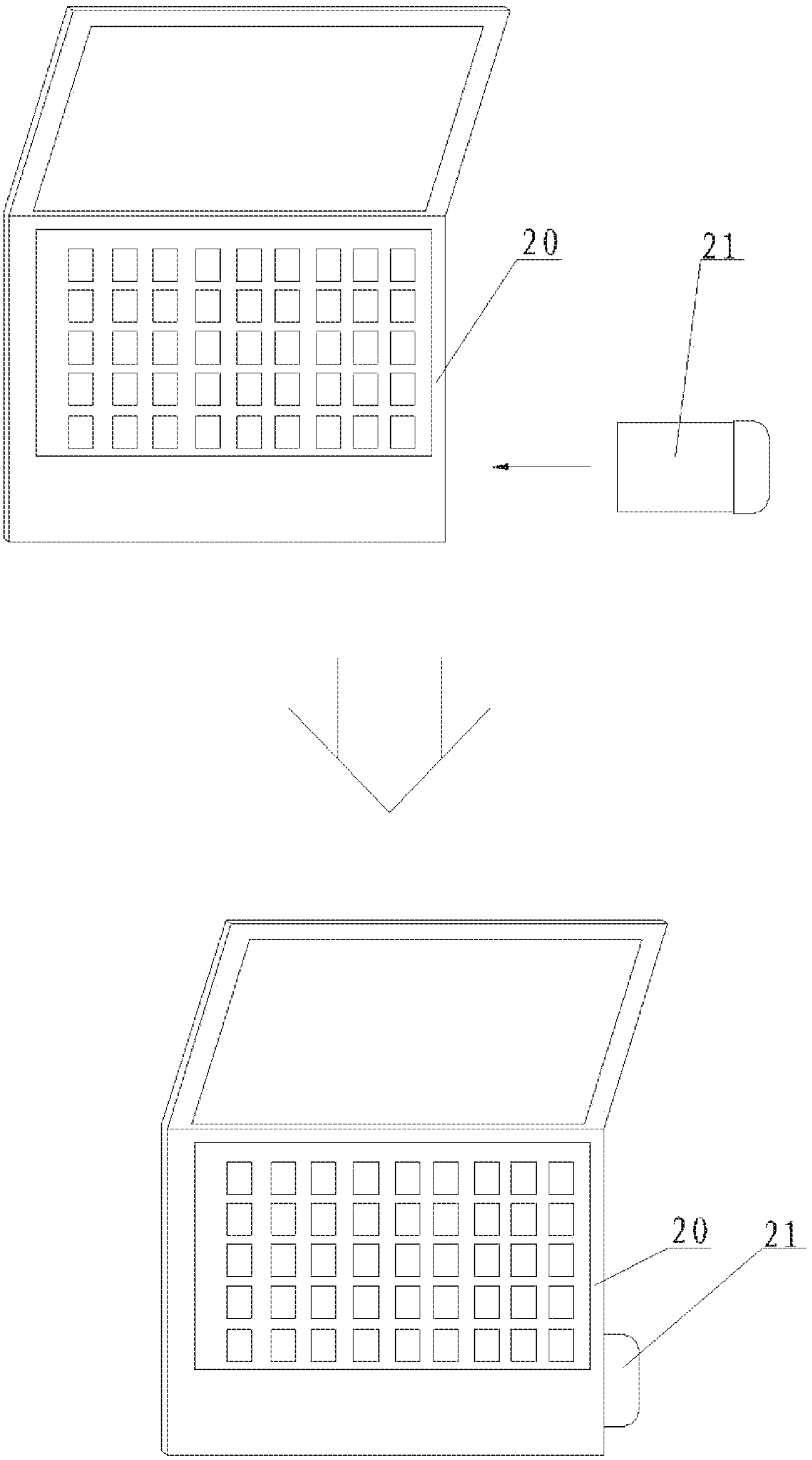
FIG. 1 is a schematic view of installing a built-in wireless data card in a notebook computer for use in the prior art.

According to the embodiment of this disclosure, the electronic device includes a device case provided with a device port and the wireless data card disclosed in the above embodiment, in which the wireless data card is disposed in the device case and relative to the device port. Referring to FIGS. 1, 2, and 3, the wireless data card includes a data card body 1 and an antenna 2 electrically connected to the data card body 1. The antenna 2 is disposed relative to the device port. An elastic structure capable of enabling the antenna 2 to extend out of the data card body 1 and the device port as well as to retract into the data card body 1 and the device port is disposed between the data card body 1 and the antenna 2.

Seen from the above, the elastic structure is capable of enabling the antenna 2 to extend out of the data card body 1 and also retract into the data card body 1. Therefore, when required to get access to the network, the elastic structure can be operated to control the antenna 2 in a state of extending out of the data card body 1, and as the antenna 2 is disposed relative to the device port, the antenna 2 in the state of extending out of the data card body 1 further extends out of the device port of the device case, thus ensuring a desired capability of receiving radio data signals; and when not required to get access to the network, the elastic structure can be operated to control the antenna 2 in a state of retracting into the data card body 1, so that the antenna 2 retracts into the device port. In this manner, the electronic device can be put in a bag with the wireless data card inserted therein and it is not necessary for the user to pull out the wireless data card, which facilitates the use of the wireless data card. Moreover, the disclosed wireless data card not only makes it easy for the user to put an electronic device with the wireless data card into a bag for storage, but also ensures a desired capability of receiving radio data signals. Therefore, the technical problem that the exposed size of the antenna of a built-in wireless data card used in an existing electronic device is too small to achieve a desired performance of receiving radio signals for the antenna is solved.

Referring to FIGS. 6 and 7, the elastic structure includes an elastic member 3 and a fastener. The elastic member 3 is disposed between the antenna 2 and the data card body 1. The antenna 2 is enabled to extend out of the data card body 1 or retract into the data card body 1 along with the stretching or compression of the elastic member 3, and the fastener is capable of fixing the antenna 2 in a state of retracting into the data card body 1. The elastic member 3 may be a spring, a rubber band, or a rubber pad. The fastener may adopt a structure of a pin engaged in a hole. For example, two through-holes are respectively opened in the data card body 1 and the antenna 2. When the antenna 2 is in the state of retracting into the data card body 1, the two through-holes are right facing each other, and at this time, the pin is inserted to prevent the antenna 2 from extending out of the data card body 1 under the elastic force of the elastic member 3. The pin is removed when the antenna 2 is needed to be used, so that the antenna 2 automatically extends out of the data card body 1 under the elastic force of the elastic member 3. The pin may also be replaced by a press-button or a catch. The fastener may include a hook on the antenna 2 and a positioning groove or hole opened in the data card body 1. When the antenna 2 is in the state of retracting into the data card body 1, the hook is engaged in the positioning groove or hole, and when the hook is released from the positioning groove or hole, the antenna 2 automatically extends out of the data card body 1 under the elastic force of the elastic member 3.

The fastener includes a slide rod 5 fixedly connected to the data card body 1 and a slideway 7 disposed on the antenna 2. A stopping boss 8 is disposed on a bottom surface of the slideway 7 away from the data card body 1, and a protruding point 11 relative to the stopping boss 8 is disposed on an inner wall 19 of the slideway 7 away from the data card body 1. One end of the slide rod 5 is provided with a buckle 10, and the buckle 10 is embedded in the slideway 7 and capable of sliding in the slideway 7.

In this embodiment, the antenna 2 includes an antenna body 22 and a connecting member 23 connected to the antenna body 22. The slideway 7 is disposed on the connecting member 23. The antenna body 22 may be electrically connected to the data card body 1 directly or through the connecting member 23. The connecting member 23 may be integrally formed with the antenna body 22, or pivoted to the antenna body 22.

Alternatively, the slide rod 5 in the fastener may also be fixedly disposed on the antenna 2 or the connecting member 23, and the slideway 7 is disposed on the data card body 1. The fastener of such structure has the same function as the aforementioned fastener.

The elastic member 3 may be a spring, the data card body 1 and/or the antenna 2 is fixedly disposed with a support latch 4, and the elastic member 3 is fixedly connected to the support latch 4. In an embodiment of this disclosure, as shown in FIG. 15, the support latch 4 is fixedly disposed on the data card body 1, and one end of the elastic member 3 is fixedly connected to the support latch 4, while the other end thereof rests against the antenna body 22 or the connecting member 23. One end of the connecting member 23 away from the antenna body 22 is disposed with at least one insertion protrusion 18, and definitely, the insertion protrusion 18 may also be directly disposed on the antenna body 22. One end of the elastic member 3 is fixedly connected to the support latch 4, and the other end thereof is inserted in the insertion protrusion 18. Alternatively, the positions of the insertion protrusion 18 and the support latch 4 may be exchanged, that is, the insertion protrusion 18 is disposed on the data card body 1, and the support latch 4 is disposed on one end of the antenna 2 or the connecting member 23 away from the antenna body 22.

Referring to FIGS. 6, 7, and 8, in an embodiment of this disclosure, the bottom surface of the slideway 7 where the stopping boss 8 is disposed is wider than that of the slideway 7 close to the data card body 1. One side of the stopping boss 8 close to the data card body 1 is in the shape of a pointed prism, and one side of the stopping boss 8 close to the antenna 2 is disposed with a groove 9 matching with the buckle 10. The inner wall 19 of the slideway 7 away from the data card body 1 is in the shape of an inverted W, and the protruding point 11 is located at the center of the inner wall 19.

At least one retaining step is disposed on the bottom surface of the slideway 7 between the stopping boss 8 and the slideway 7. The retaining step is capable of preventing the buckle 10 from sliding back when sliding in the slideway 7. One retaining step may be set as shown in FIG. 11, and two may also be set as shown in FIG. 12. In this embodiment, three retaining steps are set, which are respectively a first step 13, a second step 14, and a third step 15 with descending heights as shown in FIG. 13. The first step 13 is disposed on the bottom surface of the slideway 7 between the stopping boss 8 and a side wall of the slideway 7, and the first step 13 is higher than the bottom surface of the slideway 7 and is smoothly connected thereto. The second step 14 is disposed on the bottom surface of the slideway 7 between the first step 13 and the inner wall 19 of the slideway 7 close to the antenna 2, and is lower than the first step 13. The third step 15 is disposed on the bottom surface of the slideway 7 between the stopping boss 8 and the inner wall 19 of the slideway 7 close to the antenna 2, and is lower than the second step 14.

Referring to FIG. 14, in an embodiment of this disclosure, a guiding step 24 is further disposed on the bottom surface of the slideway 7 between the stopping boss 8 and the side wall of the slideway 7 away from the first step 13, and the guiding step 24 is higher than the bottom surface of the slideway 7. An edge of the guiding step 24 extends straightly from the end of the stopping boss 8 in the shape of a pointed prism towards the side wall of the slideway 7 away from the first step 13 and the third step 15.

In another embodiment of this disclosure, the end of the stopping boss 8 in the shape of a pointed prism inclines towards the third step 15, and the groove 9 on the stopping boss 8 is disposed close to the third step 15.

The data card body 1 includes a data card case 16 provided with an antenna port 17 and a circuit board disposed in the data card case 16. The antenna 2 is electrically connected to the circuit board and penetrates through the antenna port 17. One side of the slide rod 5 away from the data card body 1 and the antenna 2 is disposed with a slide-rod blade spring 12. One end of the slide-rod blade spring 12 is fixedly connected to the slide rod 5, and the other end thereof rests against an inner wall of the data card case 16. The longitudinal section of the slide-rod blade spring 12 is S-shaped as shown in FIG. 9 or M-shaped as shown in FIG. 10, and alternatively may also be Z-shaped, V-shaped, or the like.

In this embodiment, the data card case 16 may be integrally formed with the device case or just not provided. One side of the slide rod 5 away from the data card body 1 and the antenna 2 is disposed with a slide-rod blade spring 12. One end of the slide-rod blade spring 12 is fixedly connected to the slide rod 5, and the other end thereof rests against an inner wall of the data card case 16. The inner wall of the data card case 16 or the inner wall of the device case applies an elastic force to the slide rod 5 through the slide-rod blade spring 12, so as to enable the buckle 10 to contact the bottom surface of the slideway 7, thereby preventing the buckle 10 from falling off the slideway 7.

In this embodiment, the electronic device may be a portable mobile terminal such as a notebook computer and a personal digital assistant (PDA).

When the electronic device provided by this disclosure is adapted to access a wireless network, the antenna is in the state of extending out of the data card body, so as to ensure a desired capability of receiving radio data signals; and when carried along with the user, the antenna is in the state of retracting into the data card body, and thus it is convenient to put the electronic device in a bag for storage.

Although this disclosure is described above with some preferred embodiments, the scope thereof is not limited thereby. Various modifications and variations that can be easily thought of by those skilled in the art without departing from the scope or spirit of this disclosure should be considered falling within the scope of this disclosure. Therefore, the protecting range of this disclosure falls in the appended claims.

What is claimed is:

1. A wireless data card, comprising:

a data card body; and an antenna electrically connected to the data card body, wherein an elastic structure capable of enabling the antenna to extend out of the data card body and also retract into the data card body is disposed between the data card body and the antenna, wherein the elastic structure comprises a fastener, wherein the fastener secures the antenna in the data card body when the antenna is retracted into the data card body, wherein the fastener comprises a slide rod connected to the data card body and a slideway disposed on the antenna, wherein a stopping boss is disposed on a bottom surface of the slideway that is away from the data card body, wherein a first retaining step is disposed on the bottom surface of the slideway between the stopping boss and a side wall of the slideway, wherein the first retaining step is higher than the bottom surface of the slideway and is smoothly connected thereto, wherein a second retaining step is disposed on the bottom surface of the slideway between the first retaining step and an inner wall of the slideway that is close to the antenna, wherein the second retaining step is lower than the first retaining step, and wherein the second retaining step is separate from the stopping boss.

2. The wireless data card according to claim 1, wherein the elastic structure further comprises an elastic member, wherein the elastic member is disposed between the antenna and the data card body, wherein the antenna is extended out of the data card body when the elastic member is stretched and is retracted into the data card body when the elastic member is compressed, wherein one end of the slide rod includes a buckle, wherein the slideway comprises at least one slide rail that enables the buckle to slide along a length of the slideway as the antenna is extended out of the data card body or as the antenna is retracted into the data card body, and wherein the stopping boss comprises a recessed groove that is configured to restrain the buckle within the groove when the antenna is retracted into the data card body.

3. The wireless data card according to claim 1, wherein the elastic member comprises a spring, wherein the data card body and/or the antenna includes a support latch, wherein the data card body and/or the antenna includes a protrusion, wherein one end of the elastic member is secured to the support latch, wherein another end of the elastic member is secured to the protrusion, and wherein member is configured to at least partially retain the antenna within the data card body.

4. The wireless data card according to claim 1, wherein a protruding point corresponding to the stopping boss is disposed on the inner wall of the slideway that is away from the data card body, wherein the inner wall of the slideway that is away from the data card body comprises a shape of an inverted W, wherein the protruding point is located at a center of the inverted W, wherein the stopping boss comprises a groove that is located between the inner wall of the slideway and the wall of the stopping boss facing the data card body, wherein one end of the slide rod includes a buckle, wherein the buckle is embedded in the slideway and slides in the slideway, and wherein the buckle is configured to fit within the groove to maintain the antenna within a retracted position relative to the data card body.

5. The wireless data card according to claim 4, wherein a bottom surface of the slideway where the stopping boss is located is wider than a bottom surface of the slideway towards the data card body, wherein the wider bottom surface of the slideway where the stopping boss is located comprises two slide rails, wherein one of the two slide rails comprises a slide-in rail and another one of the two slide rails comprises a slide-out rail, and wherein the bottom surface of the slideway towards the data card body comprises one slide rail that is configured to be used for both sliding the buckle in as the antenna is retracted and sliding the buckle out as the antenna is extended.

6. The wireless data card according to claim 5, wherein the buckle is configured to be unhooked from the groove when the antenna is retracted and pushed in, and wherein the unhooked buckle is configured to slide along the protruding point in a direction away from the stopping boss to enable the antenna to be extended.

7. The wireless data card according to claim 1, wherein a third retaining step lower than the second retaining step is disposed on the bottom surface of the slideway between the stopping boss and the inner wall of the slideway that is close to the antenna, wherein the first retaining step is configured to prevent a buckle from sliding back without passing the stopping boss, wherein the second retaining step is configured to prevent the buckle from sliding back without being hooked in a groove, and wherein the third retaining step is configured to prevent the buckle from sliding back to be re-hooked in the groove after the buckle has been released from the groove.

8. The wireless data card according to claim 7, wherein a guiding step is disposed on the bottom surface of the slideway between the stopping boss and the side wall of the slideway away from the first retaining step, wherein the guiding step is higher than the bottom surface of the slideway, wherein an edge of the guiding step extends straightly from the end of the stopping boss in the shape of a pointed prism towards the side wall of the slideway away from the first retaining step and the third retaining step, and wherein the antenna is configured to be retracted into the data card body by sliding the buckle into the first retaining step, passing the buckle sequentially through the second retaining step and the third retaining step, and placing the buckle into the groove to retain the antenna with the buckle.

9. The wireless data card according to claim 1, wherein the data card body comprises a data card case including an antenna port and a circuit board disposed in the data card case, wherein the antenna is electrically connected to the circuit board and penetrates through the antenna port, wherein one side of the slide rod that is away from the data card body and the antenna includes a slide-rod blade spring disposed thereon, wherein one end of the slide-rod blade spring is connected to the slide rod, and wherein another end of the slide-rod blade spring rests against an inner wall of the data card case, wherein the slide-rod blade spring comprises an S-shape, a Z-shape, a V-shape, or an M-shape and wherein an inner wall of the data card case is configured to apply an elastic force to the slide rod through the slide-rod blade spring to enable a buckle to contact the slideway and prevent the buckle from falling off the slideway.

10. The wireless data card according to claim 1, wherein the antenna comprises an antenna body and a connecting member connected to the antenna body, wherein the slideway is disposed on the connecting member, wherein a protrusion is disposed on the connecting member, wherein a support latch is disposed on the data card body, wherein one end of the elastic member is secured to the protrusion disposed on the connecting member, wherein another end of the elastic member is secured to the support latch, wherein the elastic member is configured to at least partially retain the antenna within the data card body, and wherein the elastic member comprises a spring, a rubber band, a rubber pad, a press-button, or a catch.

11. An electronic device, comprising:

a device case including a device port and a wireless data card disposed in the device case and corresponding to the device port, wherein the wireless data card comprises a data card body and an antenna electrically connected to the data card body, wherein the antenna is disposed relative to the device port, wherein an elastic structure is configured to extend the antenna out of the data card body and the device port and to retract the antenna into the data card body and the device port, wherein the elastic structure is disposed between the data card body and the antenna, wherein the elastic structure comprises a fastener, wherein the fastener secures the antenna in the data card body when the antenna is retracted into the data card body, wherein the fastener comprises a slide rod connected to the data card body and a slideway disposed on the antenna, wherein a stopping boss is disposed on a bottom surface of the slideway that is away from the data card body, wherein a first retaining step is disposed on the bottom surface of the slideway between the stopping boss and a side wall of the slideway, wherein the first retaining step is higher than the bottom surface of the slideway and is smoothly connected thereto, wherein a second retaining step is disposed on the bottom surface of the slideway between the first retaining step and an inner wall of the slideway that is close to the antenna, wherein the second retaining step is lower than the first retaining step, and wherein the second retaining step is separate from the stopping boss.

12. The electronic device according to claim 11, wherein the antenna comprises a protrusion, wherein the data card body comprises a support latch, wherein the elastic structure comprises an elastic member, wherein the elastic member is disposed between the antenna and the data card body, wherein one end of the elastic member is secured to the protrusion of the antenna, wherein another end of the elastic member is secured to the support latch, wherein the antenna is extended out of the data card body when the elastic member is stretched and is retracted into the data card body when the elastic member is compressed, and wherein the elastic member comprises a spring, a rubber band, a rubber pad, a press-button, or a catch.

13. The electronic device according to claim 11, wherein the elastic member comprises a spring, wherein the data card body and/or the antenna has a support latch, wherein the elastic member is secured to the support latch, wherein the slide rod comprises a buckle, wherein the stopping boss comprises a groove configured to retain the buckle, wherein the first retaining step is configured to prevent the buckle from sliding back without passing the stopping boss, and wherein the second retaining step is configured to prevent the buckle from sliding back without being hooked in the groove.

14. The electronic device according to claim 11, wherein a protruding point corresponding to the stopping boss is disposed on the inner wall of the slideway that is away from the data card body, wherein one end of the slide rod includes a buckle, wherein the buckle is embedded in the slideway and slides in the slideway, wherein the slide rod comprises a pointed prism, and wherein the pointed prism is configured to reduce an area for restricting movement of the slide rod in a direction towards the antenna such that the slide rod slides in the slideway and passes the stopping boss to retract the antenna into the data card body.

15. The electronic device according to claim 11, wherein the antenna comprises an antenna body and a connecting member connected to the antenna body, wherein the connecting member comprises an L-shape that comprises a first portion and a second portion, wherein the first portion and the second portion are approximately perpendicular to each other, wherein the slideway is disposed on the first portion of the connecting member, wherein the first portion of the connecting member, the slideway, and the elastic structure are approximately parallel to each other, and wherein a side of the antenna is in contact with the second portion of the connecting member and is approximately perpendicular to the first portion of the connecting member, the slideway, and the elastic structure.

16. The electronic device according to claim 11, wherein a third retaining step lower than the second retaining step is disposed on the bottom surface of the slideway between the stopping boss and the inner wall of the slideway that is close to the antenna, wherein the first retaining step is configured to prevent a buckle from sliding back without passing the stopping boss, wherein the second retaining step is configured to prevent the buckle from sliding back without being hooked in a groove, and wherein the third retaining step is configured to prevent the buckle from sliding back to be re-hooked in the groove after the buckle has been released from the groove.

17. The electronic device according to claim 11, wherein the data card body comprises a data card case having an antenna port and a circuit board disposed in the data card case, wherein the antenna port is disposed in the device port, wherein the antenna is electrically connected to the circuit board and penetrates through the antenna port, wherein one side of the slide rod that is away from the data card body and the antenna has a slide-rod blade spring disposed thereon, wherein one end of the slide-rod blade spring is connected to the slide rod, wherein another end of the slide-rod blade spring rests against an inner wall of the data card case, wherein the slide-rod blade spring comprises an S-shape, a Z-shape, a V-shape, or an M-shape, and wherein an inner wall of the data card case is configured to apply an elastic force to the slide rod through the slide-rod blade spring to enable a buckle to contact the slideway and prevent the buckle from being removed from the slideway.

18. The electronic device according to claim 11, wherein one side of the slide rod that is away from the data card body and the antenna has a slide-rod blade spring disposed thereon, wherein one end of the slide-rod blade spring is fixedly connected to the slide rod, wherein another end of the slide-rod blade rests against an inner wall of the device case, wherein the slide rod comprises a main body portion and a buckle, wherein the main body has an approximately cylindrical shape that is parallel to a path that the antenna is retracted into and extended from, and wherein the buckle of the slide rod is approximately perpendicular to the main body portion of the slide rod.

19. The electronic device according to claim 16, wherein a guiding step is disposed on the bottom surface of the slideway between the stopping boss and the side wall of the slideway away from the first retaining step, wherein the guiding step is higher than the bottom surface of the slideway, wherein an edge of the guiding step extends straightly from the end of the stopping boss in the shape of a pointed prism towards the side wall of the slideway away from the first retaining step and the third retaining step, and wherein the antenna is configured to be retracted into the data card body by sliding the buckle into the first retaining step, passing the buckle sequentially through the second retaining step and the third retaining step, and placing the buckle into the groove to retain the antenna with the buckle.

20. A wireless data card, comprising:

a data card body; and an antenna electrically connected to the data card body, wherein an elastic structure capable of enabling the antenna to extend out of the data card body and retract into the data card body is disposed between the data card body and the antenna, wherein the elastic structure comprises a fastener, wherein the fastener secures the antenna in the data card body when the antenna is retracted into the data card body, wherein the fastener comprises a slide rod connected to the data card body and a slideway disposed on the antenna, wherein a stopping boss is disposed on a bottom surface of the slideway that is away from the data card body, wherein a first retaining step is disposed on the bottom surface of the slideway between the stopping boss and a side wall of the slideway, wherein the first retaining step is higher than the bottom surface of the slideway and is smoothly connected thereto, wherein a second retaining step is disposed on the bottom surface of the slideway between the first retaining step and an inner wall of the slideway that is close to the antenna, wherein the second retaining step is lower than the first retaining step, wherein the second retaining step is separate from the stopping boss, wherein a third retaining step lower than the second retaining step is disposed on the bottom surface of the slideway between the stopping boss and the inner wall of the slideway that is close to the antenna, wherein the first retaining step is configured to prevent a buckle from sliding back without passing the stopping boss, wherein the second retaining step is configured to prevent the buckle from sliding back without being hooked in a groove, wherein the third retaining step is configured to prevent the buckle from sliding back to be re-hooked in the groove after the buckle has been released from the groove, and wherein the antenna is configured to be retracted into the data card body by sliding the buckle into the first retaining step, passing the buckle sequentially through the second retaining step and the third retaining step, and placing the buckle into the groove to retain the antenna with the buckle.

* * * * *